(12) United States Patent
Muller et al.

(10) Patent No.: US 8,140,583 B2
(45) Date of Patent: Mar. 20, 2012

(54) TAG SYNDICATES

(75) Inventors: Michael Muller, Medford, MA (US); Andrew L. Schirmer, Andover, MA (US); Casey Dugan, Medford, MA (US); Jennifer Thom-Santelli, Ann Arbor, MI (US); Suzanne O. Minassian, Boston, MA (US)

(73) Assignee: International Business Machines Corporation, Armonk, NY (US)

( * ) Notice: Subject to any disclaimer, the term of this patent is extended or adjusted under 35 U.S.C. 154(b) by 502 days.

(21) Appl. No.: 12/017,029

(22) Filed: Jan. 19, 2008

(65) Prior Publication Data

US 2009/0187576 A1 Jul. 23, 2009

(51) Int. Cl.
*G06F 17/30* (2006.01)
*G06F 7/00* (2006.01)
(52) U.S. Cl. .................................................. 707/802
(58) Field of Classification Search .............. 707/104.1, 707/10, 802
See application file for complete search history.

(56) References Cited

U.S. PATENT DOCUMENTS

| | | | |
|---|---|---|---|
| 2007/0124208 A1* | 5/2007 | Schachter et al. | 705/14 |
| 2007/0250866 A1* | 10/2007 | Yamada | 725/58 |
| 2008/0162275 A1* | 7/2008 | Logan et al. | 705/12 |
| 2009/0055355 A1* | 2/2009 | Brunner et al. | 707/3 |

* cited by examiner

*Primary Examiner* — Kuen Lu
(74) *Attorney, Agent, or Firm* — Steven M. Greenberg, Esq.; Carey, Rodriguez, Greenberg & O'Keefe

(57) ABSTRACT

Embodiments of the present invention address deficiencies of the art in respect to social bookmarking and provide a method, system and computer program product for tag syndicates in a social bookmarking system. In an embodiment of the invention, a tag syndicate method can be provided. The method can include establishing different tag syndicates, each tag syndicate providing a specified set of users of a social bookmarking system. The method further can include selecting at least one tag syndicate for use in conducting a content operation, and performing a content operation utilizing the social bookmarking system based upon the selected tag syndicate or syndicates. In this regard, the content operation can be a visible operation such as a type ahead operation, or a logical operation such as sorting content search results.

21 Claims, 1 Drawing Sheet

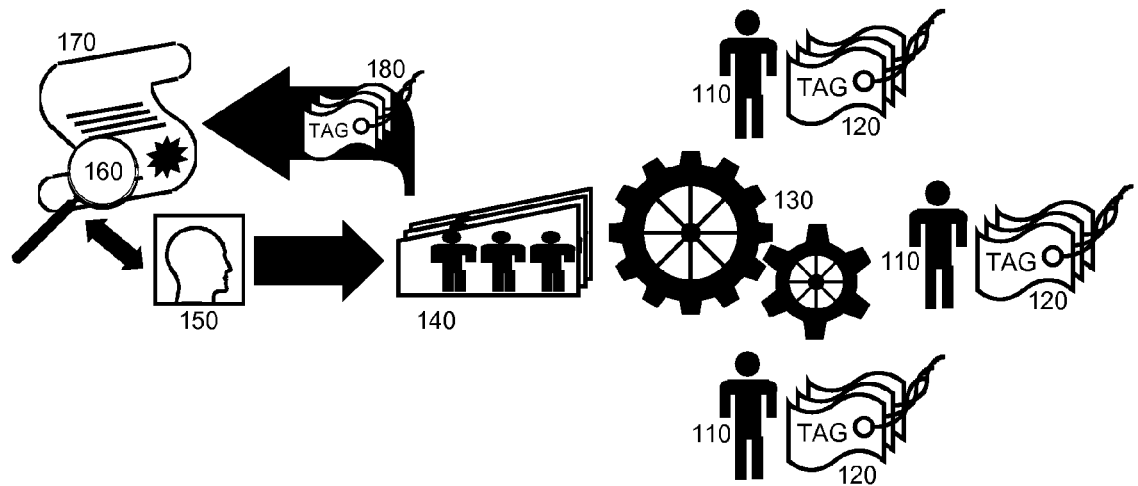
FIG. 1
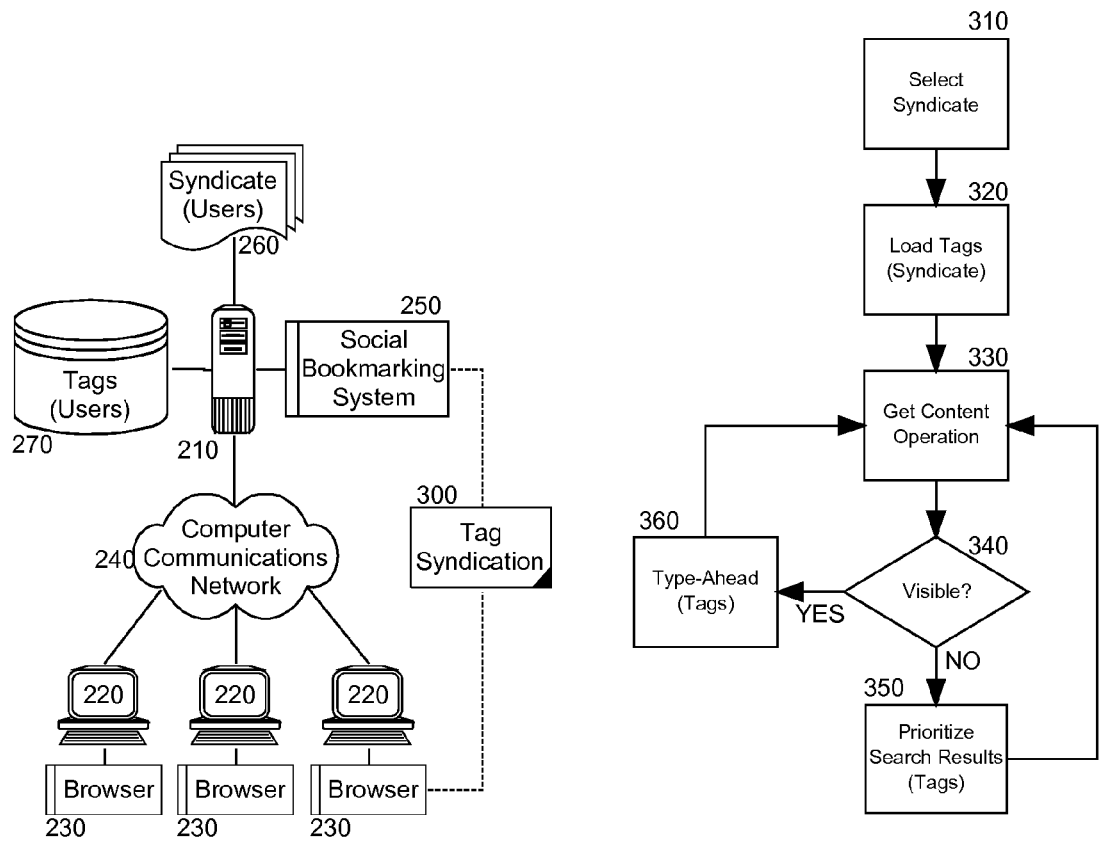
FIG. 2
FIG. 3

TAG SYNDICATES

BACKGROUND OF THE INVENTION

1. Field of the Invention

The present invention relates to the field of bookmarking content and more particularly to social bookmarking.

2. Description of the Related Art

Content browsing refers to the retrieval and presentation of electronic content in a browser client. Content generally can include electronic documents, messages, audio, audiovisual and video materials and imagery. Most commonly, content can be stored in a server environment and published for access by content consumers over a computer communications network such as the global Internet. Content consumers, in turn, can retrieve content over the network by reference to a network address for the content. Once retrieved, the content can be presented in a browser client including not only conventional visual browsers such as the venerable Web browser, but also in alternative browsers such as those deployed in pervasive devices and those supporting different modes of presentation such as the audible presentation of material.

Given the vast amount of content published for accessibility over the Internet, modern content browsers provide a mechanism for ably retrieving previously accessed content. Known as a "bookmark" or "favorite" (collectively referred to as a bookmark), end users can record content of interest as a bookmark. Subsequently, end users can access a list of bookmarks in order to recall the content of interest without being compelled to recall from memory the precise uniform resource indicator (URI) for the content of interest.

While bookmarking reflects the personal experience of individual users, social bookmarking provides a foundation for users within a social group to store, organize, share and search the bookmarks collectively established by the users within the social group. In the operation of a social bookmarking system, users save links to memorable content. Unlike traditional bookmarks however, in a social bookmarking system the links subsequently can be published for public inspection and use so as to provide a communal repository of bookmarks. Consequently, groups of the users can access the links encapsulated within respective social bookmarks, though the groups of users in fact may never have viewed the associated content—a prerequisite for a traditional bookmark.

Social bookmarking services often encourage users in a social network to annotate bookmarks with meta-information referred to as "tags" rather than merely storing bookmarks in a traditional file hierarchy. As such, users processing tags for a social bookmark can view the social bookmark for content along with the tag pertaining to the bookmark, for instance a number of users having bookmarked the content. Further, some social bookmarking services infer clusters of bookmarks from the relationship of corresponding tags. Finally, many social bookmarking services provide subscription based feeds for lists of bookmarks, including lists organized by tags. Consequently, subscribers can become aware of new bookmarks as the bookmarks are saved, shared, and tagged by other users.

Social bookmarking services have become very popular, with correspondingly large numbers of users. By way of example, a subgroup of users may wish to conduct joint research, or to share a selection of bookmarks in a manner that helps the subgroup to organize shared work. A subgroup of users also may wish to leverage each others' work in creating tags and/or in conducting searches. Moreover, any user may participate in multiple working groups, and may wish to work with a first group in the morning, and a second group in the afternoon, without confusing the shared work with the morning collaborators, with the shared work with the afternoon collaborators. Conventional social bookmarking sites, however, provide no means for working with subgroups of users.

BRIEF SUMMARY OF THE INVENTION

Embodiments of the present invention address deficiencies of the art in respect to social bookmarking and provide a novel and non-obvious method, system and computer program product for tag syndicates in a social bookmarking system. In an embodiment of the invention, a tag syndicate method can be provided. The method can include establishing different tag syndicates, each tag syndicate providing a selection of users of a social bookmarking system. The method further can include selecting at least one tag syndicate for use in conducting a content operation, and performing a content operation utilizing the social bookmarking system based upon the selected tag syndicate or syndicates. In this regard, the content operation can be a visible operation such as a type ahead operation, or a logical operation such as sorting content search results.

In another embodiment of the invention, a social bookmarking data processing system can be provided. The system can include a social bookmarking system executing in a host server and configured for coupling to a plurality of content browsers over a computer communications network. The system also can include a data store of tags associated with different users of the social bookmarking system. Specifically, the data store of tags can be rendered accessible by the social bookmarking system. Finally, the system can include tag syndicate logic. The logic can include program code enabled to establish different tag syndicates, each providing a selection of the users, to select at least one tag syndicate for use in conducting a content operation, and to perform a content operation utilizing the social bookmarking system based upon the selected tag syndicate or syndicates.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein:

FIG. 1 is a pictorial illustration of a process for managing tag syndicates in a social bookmarking system;

FIG. 2 is a schematic illustration of a social bookmarking data processing system configured for tag syndicate management and use; and, FIG. 3 is a flow chart illustrating a process for tag syndicate management in a social bookmarking system.

DETAILED DESCRIPTION OF THE INVENTION

Embodiments of the present invention provide a method, system and computer program product for tag syndicates in a social bookmarking system. In accordance with an embodiment of the present invention, a set of users can be selected for inclusion in a tag syndicate. Different tag syndicates can be formed for different users. When a tag syndicate has been selected for use by a user, the aggregation of tags provided by the users in the tag syndicate can be used to provide visible assistance for the user, both visibly and logically. From the point of visibility, the tags for the tag syndicate can be used to influence type-ahead auto-completion for tag entry and also tag searching. From the point of logic, the tags can be used to influence a prioritization or filtration of search results during content searching, and also to provide a basis for recommending content to users in the tag syndicate.

In further illustration, FIG. 1 is a pictorial illustration of a process for managing tag syndicates in a social bookmarking system. As shown in FIG. 1, tag syndicates 140 can be formed to include different users 110 of a social bookmarking system 130. For a given user 150 of the social bookmarking system 130, a syndicate 140 can be selected for use during both visible and logical operations. Thereafter, the tags 180 associated with the users 110 in the selected syndicate 140 can be applied in visible and logical operations 160 pertaining to the browsing of content 170.

In this regard, the tags 180 of the selected syndicate 140 can be used to compute type-ahead suggestions during the visible operations of content searching or tagging of content. By comparison, the tags 180 of the selected syndicate 140 can be used during the logical operations of sort ordering content search results. The sorting can be based upon bookmarks already provided by members 110 of the selected syndicate 140, or by resources similarly tagged by other members 110 of the selected syndicate 140. Finally, tags provided by the given user 150 can be propagated to the members 110 of the selected syndicate as recommendations of resources or tags.

The process shown in FIG. 1 can be implemented in connection with a social bookmarking system 130. In illustration, FIG. 2 schematically depicts a social bookmarking data processing system configured for tag syndicate management and use. The system can include a host server 210 configured for communicative coupling to different clients 220 over computer communications network 240. The host server 240 can support the operation of a social bookmarking system 250 coupled to a data store of tags 270 for users of the social bookmarking system 250 and in communication with different content browsers 230, each associated with one of the clients 220 through which content can be tagged and stored in the data store of tags 270 by end users.

Notably, tag syndicate logic 300 can be coupled to the social bookmarking system and to each of the content browsers 230 over the computer communications network 240. In this regard, the tag syndicate logic 300 can be resident in the host server 210 in each of the content browsers 230, in a separate server (not shown) or any combination thereof. The tag syndicate logic 300 can include program code enabled to group different users of the social bookmarking system 250 into individual tag syndicates 260. The program code further can be enabled to support visible and logical operations for individual users of the social bookmarking system 250 using a filtered set of the tags 250 corresponding to users in a selected one of the tag syndicates 260.

In one aspect of the embodiment, a given user can select multiple ones of the tag syndicates 260 to be active in supporting visible and logical operations. In this circumstance, a union of the users in each of the multiple ones of the tag syndicates 260 can be computed as a temporary tag syndicate. Alternatively, an intersection of the users from each of the multiple ones of the tag syndicates 260 can be computed as a temporary tag syndicate. In another aspect of the embodiment, end users can create a temporary form of the tag syndicates 260 based upon a search of data in the social bookmarking system 250. For instance, a temporary one of the tag syndicates 260 can be formed from a search for "all users who have tagged the term 'IBM'. The search can be live in the sense that the users in the temporary one of the tag syndicates 260 can change periodically as the search results for the search change. In any event, at the discretion of the end user, the temporary one of the tag syndicates 260 can be rendered permanent.

Of note, tag syndicates 260 can be shared with other users. This act of sharing make the tag syndicate visible (and usable) by the other users. Optionally, this sharing is done on a read-only basis. Yet further, the sharing can provide editing privileges to the other users. Even yet further, individual ones of the tag syndicates 260 can be made public such that other users can view the list of names, and can use selected ones of the tag syndicates 260 in queries. Finally, public ones of the tag syndicates 260 can be edited by other users who can add tags and associated resources.

As another option, a user-created one of the tag syndicates 260 can be compared with other, already-recorded public ones of the tag syndicates 260, such that users can be notified of tag syndicates 260 whose user membership is similar to the user membership of the user-created one of the tag syndicates 260. Optionally, the user may specify the criteria for "similar." As even yet another option, visualizations of similarity or network closeness can be displayed for different tag syndicates 260, for example by overlapping memberships or tag and resource similarities.

In even yet further illustration of the operation of the tag syndicate logic 300, FIG. 3 is a flow chart illustrating a process for tag syndicate management in a social bookmarking system. Beginning in block 310, one or more tag syndicates can be selected for use in both visible and logical operations in the social bookmarking system. In block 320, the tags for the different users common to the selected tag syndicates can be loaded and in block 330 a content operation can be directed. The content operation can include a visible operation such as a tag entry or a tag search. The content operation also can include a logical operation such as generating search results for search terms.

In decision block 340, if the content operation is a visible operation, in block 360 type-ahead text can be determined based upon the loaded tags. Thereafter, the process can repeat through block 330. By comparison, in decision block 340 if the content operation is a logical operation, in block 350 the search results produced by a content search can be prioritized or sequenced according to which bookmarks are shared with other members of the tag syndicate, or based upon which resources in the search results have been tagged similarly by the end user to the loaded tags of other members of the tag syndicate. The search results may also be filtered based upon bookmarks shared with other members of the tag syndicate, or based upon tagging patterns in the search results of other members of the tag syndicate. Thereafter, the process can repeat through block 330.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain or store the program for use by or in connection with the instruction execution system, apparatus, or device. The storage medium can be an electronic, magnetic, optical, electromagnetic, infrared, or semiconductor system (or apparatus or device). Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A tag syndicate method comprising:
   establishing different tag syndicates, each tag syndicate comprising a specified set of users of a social bookmarking system executing in memory of a host server;
   selecting at least one tag syndicate for use in conducting a content operation; and,
   performing a content operation utilizing the social bookmarking system based upon the selected at least one tag syndicate.

2. The method of claim 1, wherein performing a content operation utilizing the social bookmarking system based upon the selected at least one tag syndicate, comprises performing a visible operation utilizing the social bookmarking system based upon the selected at least one tag syndicate.

3. The method of claim 1, wherein performing a content operation utilizing the social bookmarking system based upon the selected at least one tag syndicate, comprises performing a logical operation utilizing the social bookmarking system based upon the selected at least one tag syndicate.

4. The method of claim 1, wherein performing a visible operation utilizing the social bookmarking system based upon the selected at least one tag syndicate, comprises performing a type ahead operation utilizing tags from the selected at least one tag syndicate.

5. The method of claim 1, wherein performing a logical operation utilizing the social bookmarking system based upon the selected at least one tag syndicate, comprises sorting search results according to tags from the selected at least one tag syndicate.

6. The method of claim 1, wherein performing a logical operation utilizing the social bookmarking system based upon the selected at least one tag syndicate, comprises filtering search results according to tags from the selected at least one tag syndicate.

7. The method of claim 1, further comprising recommending tags to users of the at least one tag syndicate.

8. The method of claim 1, further comprising establishing a temporary syndicate for use in performing the content operation based upon users of the social bookmarking system produced through a query of user characteristics.

9. The method of claim 1, further comprising sharing individual ones of the tag syndicates with other users of the social bookmarking system.

10. A social bookmarking data processing system comprising:
    a social bookmarking system executing in memory by at least one processor of a host server and configured for coupling to a plurality of content browsers over a computer communications network;
    a data store of tags associated with different users of the social bookmarking system, the data store of tags being accessible by the social bookmarking system; and,
    tag syndicated logic comprising program code enabled to establish different tag syndicates, each comprising a specified set of the users, to select at least one tag syndicate for use in conducting a content operation, and to perform a content operation utilizing the social bookmarking system based upon the selected at least one tag syndicate.

11. The system of claim 10, wherein the content operation is a type ahead operation.

12. The system of claim 10, wherein the content operation is a sort operation for content search results.

13. The system of claim 10, wherein the content operation is a filter operation on content search results.

14. A computer program product comprising a non-transitory computer usable storage medium embodying computer usable program code for tag syndicate, the computer program product comprising:
    computer usable program code for establishing different tag syndicates, each tag syndicate comprising a specified set of users of a social bookmarking system;
    computer usable program code for selecting at least one tag syndicate for use in conducting a content operation; and,
    computer usable program code for performing a content operation utilizing the social bookmarking system based upon the selected at least one tag syndicate.

15. The computer program product of claim 14, wherein the computer usable program code for performing a content operation utilizing the social bookmarking system based upon the selected at least one tag syndicate, comprises computer usable program code for performing a visible operation utilizing the social bookmarking system based upon the selected at least one tag syndicate.

16. The computer program product of claim 14, wherein the computer usable program code for performing a content operation utilizing the social bookmarking system based upon the selected at least one tag syndicate, comprises computer usable program code for performing a logical operation utilizing the social bookmarking system based upon the selected at least one tag syndicate.

17. The computer program product of claim 14, wherein the computer usable program code for performing a visible operation utilizing the social bookmarking system based upon the selected at least one tag syndicate, comprises computer usable program code for performing a type ahead operation utilizing tags from the selected at least one tag syndicate.

18. The computer program product of claim 14, wherein the computer usable program code for performing a logical operation utilizing the social bookmarking system based upon the selected at least one tag syndicate, comprises computer usable program code for sorting search results according to tags from the selected at least one tag syndicate.

19. The computer program product of claim 14, further comprising computer usable program code for recommending tags to users of the at least one tag syndicate.

20. The computer program product of claim 14, further comprising computer usable program code for establishing a temporary syndicate for use in performing the content operation based upon users of the social bookmarking system produced through a query of user characteristics.

21. The computer program product of claim 14, further comprising computer usable program code for sharing individual ones of the tag syndicates with other users of the social bookmarking system.

* * * * *